United States Patent [19]

Oehler et al.

[11] Patent Number: 5,476,243
[45] Date of Patent: Dec. 19, 1995

[54] ELECTROMAGNETICALLY ACTUATED VALVE PARTICULARLY FOR SLIP-CONTROLLED HYDRAULIC BRAKE SYSTEMS IN MOTOR VEHICLES

[75] Inventors: Martin Oehler, Leingarten; Guenther Hohl, Stuttgart; Norbert Mittelwollen, Markgroeningen; Hans-Juergen Herderich, Kernen; Stephan Jonas, Gerlingen, all of Germany

[73] Assignee: Robert Bosch GmbH, Stuttgart, Germany

[21] Appl. No.: 321,957

[22] Filed: Oct. 12, 1994

[30] Foreign Application Priority Data

Nov. 22, 1993 [DE] Germany ............... 43 39 694.1

[51] Int. Cl.⁶ ..................................... F16K 31/06
[52] U.S. Cl. ........................... 251/24; 251/129.02
[58] Field of Search .................... 251/24, 129.02

[56] References Cited

U.S. PATENT DOCUMENTS 3,829,060   8/1974   Lewis .................. 251/129.02

FOREIGN PATENT DOCUMENTS 3934771   3/1991   Germany .

Primary Examiner—Robert G. Nilson
Attorney, Agent, or Firm—Edwin E. Greigg; Ronald E. Greigg

[57] ABSTRACT

A valve having a magnetic armature, which is moved longitudinally in a valve dome; a valve tappet of this armature carries a closing member of a seat valve, which is open when in the rest position. The seat valve is disposed in a valve chamber, from which two pressure fluid conduits lead to face ends of the magnetic armature, which is sealed on its circumference side. When the seat valve is partially open, a pressure is produced in a partial valve chamber by means of a shaping of the valve seat as a hollow cone and of the closing member as a flattened end ball. In the control chamber remote from the closing member, this pressure leads to a movement of the magnetic armature against the tension of a restoring spring, which results in a reduction of the through flow cross section of the seat valve. The valve is particularly useful in slip-controlled hydraulic brake systems of motor vehicles.

5 Claims, 2 Drawing Sheets

ELECTROMAGNETICALLY ACTUATED VALVE PARTICULARLY FOR SLIP-CONTROLLED HYDRAULIC BRAKE SYSTEMS IN MOTOR VEHICLES

BACKGROUND OF THE INVENTION

The invention is based on an electromagnetically actuated valve, particularly for slip-controlled hydraulic brake systems in motor vehicles as defined hereinafter.

A valve of this kind is known by means of German Patent 39 34 771 C1, FIG. 3. It has a control piston disposed in the valve dome which piston forms a stop for the magnetic armature and which is guided so that it can slide longitudinally on a tang, which leads from the valve body and penetrates the magnetic armature. The control piston defines with its base remote from the armature a control chamber, which communicates with the pressure fluid inlet of the known valve by means of a pressure fluid conduit which penetrates the tang and the control piston on the same axis. While the magnetic armature is pressure balanced on both face ends, controlled pressure introduced into the control chamber can slide the control piston axially against a stop. By means of this, the stroke of the magnetic armature is reduced by a predetermined measure, which results in a throttling of the through flow cross section.

This manner of function of the known valve is useful in slip-controlled hydraulic brake systems in which the pressure fluid inlet communicates with the master cylinder and the pressure fluid outlet communicates with a brake cylinder. In a controlling of brake slip for example, the valve is switched into its closed position by means of exciting the magnet coil and upon reduction of the pressure in the brake cylinder, produces a high enough pressure difference between the pressure fluid inlet and the pressure fluid outlet, so this leads to the above mentioned sliding of the control piston with the result that upon opening the valve, the previously described throttling of the through flow cross section is in effect, as long as the pressure difference between inlet and outlet exists. Because of the reduced pressure gradient during the pressure buildup of a controlling of brake slip that follows a pressure decrease, the reduction of the through flow cross section has a positive effect on the standard quality and noise behavior of the brake system. In a normal braking without danger of locking, in comparison, the entire through flow cross section of the valve is available, which expedites a desired short reaction time of the brake system upon actuation of the brakes.

With the known valve, however, the fixed adjustment of the throttled through flow cross section is disadvantageous because by means of this, the through flow quantity is subject to fluctuations which depend on the pressure differential. Besides, the through flow quantity is in essence completely dependent upon the absolute measure of the through flow cross section, i.e. the stop requires a very narrow tolerancing. Further, the valve is relatively expensive to produce because of the control piston it requires.

OBJECT AND SUMMARY OF THE INVENTION

The valve according to the invention has the advantage over the prior art that in the transition from the closed position to the open position, depending on forces acting on the magnetic armature and on the valve tappet having the closing member, but in the absence of magnetic force, as well as when there is an adequately great pressure difference between inlet and outlet sides of the valve, the through flow cross section of the seat valve automatically adjusts itself to a smaller opening in comparison to the full valve opening, which results in a reduced, largely constant through flow quantity. This flow regulating function is achieved in a simple manner in that the pressure fluid streams emerging from the valve seat during partial opening of the seat valve take a different course than those emerging from a fully open or mostly open valve. When the valve is partially open, the pressure fluid streams are directed into the partial valve chamber, where they produce a ram pressure, while when the valve is open, the pressure fluid streams encounter the flattening of the closing member and create a force acting in the opening direction.

Further advantageous embodiments and improvements on the valve indicated are possible by means of the measurements given in the disclosure.

The embodiment of the seat valve is especially advantageous because it characterizes especially easy-to-produce forms of the valve seat and closing member.

With the measurements given herein, when the seat valve is partially open, the pressure fluid streams are guided in an effective manner into the partial valve chamber and the ram pressure produced by the streams is intensified by means of the throttling gap that leads to the valve chamber.

In addition, the further embodiment of the invention has the advantage that by means of this embodiment a separation of both armature face ends is achieved in a simple manner according to the pressure to produce a dynamic effect on the magnetic armature.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
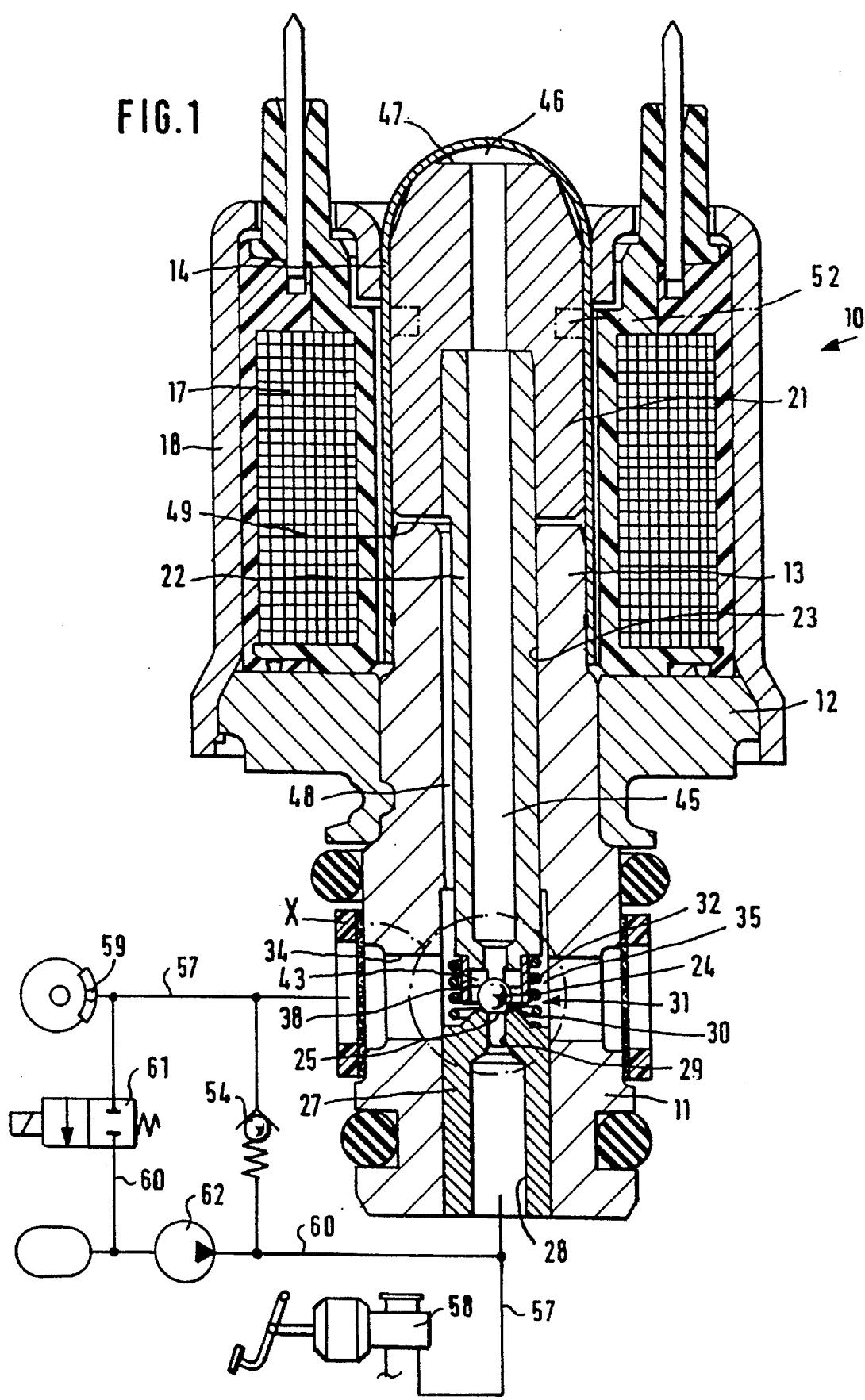
FIG. 1 shows a longitudinal section through an electromagnetically actuated valve.

An electromagnetically actuated valve 10 has a valve housing 11 designated to be received by a valve block not shown, which housing is connected to a yoke disk 12 (FIG. 1). The valve housing 11 extends outward via the yoke disk 12, having a pole core 13. A tubular valve dome 14 is placed upon the pole core 13. It is sealingly connected to the pole core 13 by means of a weld. Remote from the pole core 13, the valve dome 14 has a semi-spherical ball shaped closing.

The valve dome 14 is encompassed by a ring-shaped magnet coil 17. A bell-shaped housing 18 surrounds the magnet coil 17. The housing 18 on the one end engages the valve dome 14 and on the other end is connected to the yoke disk 12.

An essentially circular, cylindrical magnetic armature 21 is received so that it can move longitudinally in the closed valve dome 14 on the coil side. A valve tappet 22 leads from the magnetic armature 21 and is attached to it. The valve tappet 22 is disposed having play in a longitudinal bore 23 of the valve housing 11. On its end remote from the armature, the valve tappet 22 carries a closing member that is embodied as essentially ball-shaped. The closing member 24, which is designed in the exemplary embodiment as a solid ball, is joined by material adhesion to the valve tappet 22. On its end remote from the magnetic armature 21, the closing member 24 has a circular flattening 25, which lies in a plane that runs perpendicular to the tappet's longitudinal axis. Diverging from the exemplary embodiment, the closing member 24, remote from the armature, can also embody a straight, circular, truncated cone.

A sleeve-shaped valve body 27 having a stepped bore 28 is pressure installed in the section of the longitudinal bore 23 remote from the armature, which stepped bore 28, having a longitudinal bore 29 with a small diameter, feeds into a valve seat 30. The valve seat 30 is embodied as a cone-shaped countersink preferably having a cone angle of 90° with an open contour cross section; it consequently has the curved surface shape of a hollow, straight, circular, truncated cone. The diameter of the flattening end 25 on the closing member 24 approximately corresponds to the diameter of the longitudinal bore 29. The closing member 24 and the valve seat 30 form a seat valve 31 of the electromagnetically actuated valve 10. When the magnet coil 17 is not excited, the seat valve 31 assumes its open position as a rest position due to the effect of a prestressed restoring spring 32, which on one end engages the valve tappet 22 and on the other end engages the valve body 27.

The valve housing 11 is provided with a perpendicular lateral bore 34 which crosses the longitudinal bore 23. A valve chamber 35 which receives the seat valve 31 is formed in the pressure penetration region of both bores 23 and 34. On one side the valve chamber 35 communicates with a pressure fluid inlet via the valve seat 30 and the longitudinal bore 29 as well as the stepped bore 28 and on the other side adjoins a pressure fluid outlet on the valve chamber 35, which outlet is formed by the lateral bore 34.

In addition to the seat valve 31 and the restoring spring 32, in the valve chamber 35 there is also a guide body 38 for pressure fluid. The guide body 38 is embodied as sleeve shaped and is attached to the valve tappet 22 so that it extends along the same axis as the tappet. The guide body 38 encompasses the closing member 24 of the seat valve 31 forming a relatively wide radial gap 39 and extends forming an axial gap 40 close to the valve body 27 as is clear from FIG. 2. When the valve 10 is in its rest position, the axial gap 40 has a greater measure compared to the valve stroke, i.e. in the closed position of the seat valve 31, which constitutes the work position of the valve 10, in which the closing member 24 engages the valve seat 30, the axial gap 40 is reduced to a minimum measure.

The guide body 38 separates a partial chamber 43 from the valve chamber 35, which partial chamber 43 acts as a retaining capacity for the pressure fluid. By means of a cross slot 44 of the valve tappet 22, which slot is remote from the valve seat 31, this partial valve chamber 43 communicates with a first pressure fluid conduit 45, which is embodied as a continuous longitudinal bore in the valve tappet 22 and in the magnetic armature 21. The first pressure fluid conduit 45 leads to a control chamber 46, which is disposed between the face end 47 of the magnetic armature 21 remote from the closing member 24 and the semi-spherical ball-shaped closing of the valve dome 14. Outside the guide body 38 a second pressure fluid conduit 48 also leads from the valve chamber 35, which conduit is embodied as a flattening of the valve tappet 22, which has an otherwise circular cross section. This comes to an end at the face end 49 of the magnetic armature 21 close to the closing member 24, which face end 49 is disposed opposite the pole core 13 to form a gap.

On the circumference, i.e. between both face ends 47 and 49, the magnetic armature 21 is sealed against the valve dome 14. This seal can be achieved by means of a gap or labyrinth seal; it can, however, also be achieved by the disposition of a sealing ring 52 or a slide ring on the magnetic armature 21, as shown by the dashed line in FIG. 1.

The valve 10 is especially designated for use in a slip-controlled hydraulic brake system for motor vehicles. Corresponding to the brake system that is shown in FIG. 1 of German Patent 39 34 771 C1 mentioned at the beginning, the valve 10 is to be disposed in a brake line 57 between a master cylinder 58 and a brake cylinder 59. The pressure fluid inlet formed by the stepped bore 28 communicates then with the master cylinder and the lateral bore 34, acting as a pressure fluid outlet, communicates with the brake cylinder 59. The valve 10 can be bypassed by a return line 60, which leads from the brake line 57 on the brake cylinder side and feeds back into it on the master cylinder side. An outlet valve 61 and a return feed pump 62 downstream of it are situated as essential elements in the return line 60. To bridge over the seat valve 31, a check valve 54 is disposed in a practical manner parallel to the valve 10, between pressure fluid outlet and pressure fluid inlet, which check valve 54, when pressure is discharged from the master cylinder 58, makes possible an unthrottled return flow from brake cylinder 59 to master cylinder 58.

Figure 3:
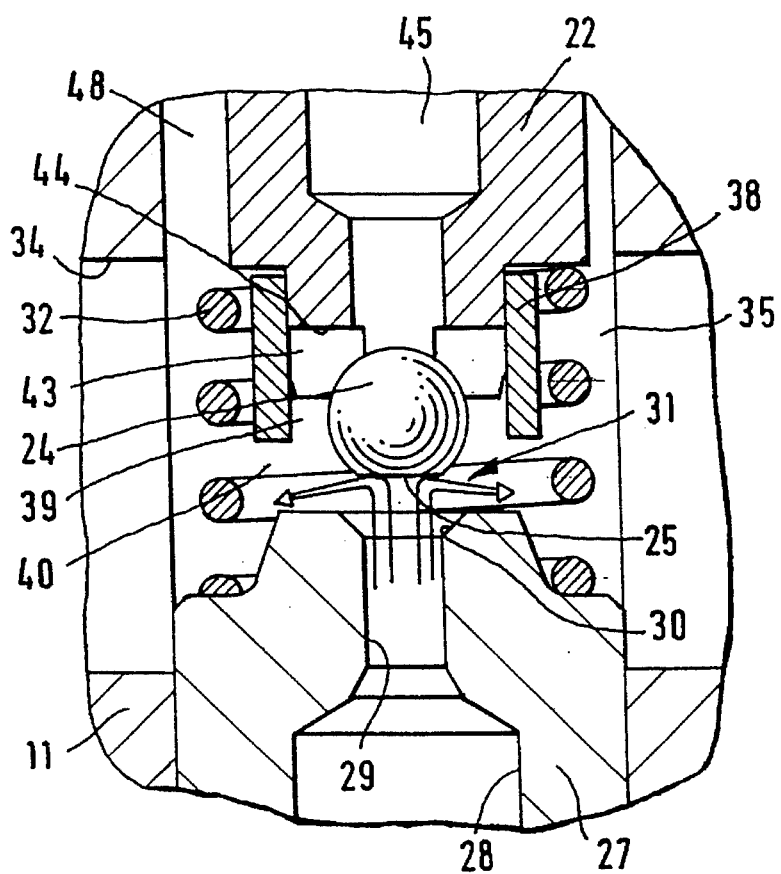
FIG. 3 shows an enlarged seat valve fully open.

The function of the valve 10 from the above-mentioned brake system is explained below:

In a braking without danger of locking, initiated by the driver of the vehicle, the valve 10 assumes its rest position, shown in FIGS. 1 and 3, i.e. the seat valve 31 is open. The pressure produced by means of actuating the master cylinder 58 leads to a pressure buildup in the brake cylinder 59 by means of displacing pressure fluid quantities in the brake line. As is explained in FIG. 3 and made clearer by means of arrows, the displaced pressure fluid coming from the stepped bore 28 and the longitudinal bore 29 in the valve body 27 flows through the valve seat 30 without experiencing an appreciable diversion in it and hits the flattening 25 of the closing member 24. The pressure fluid exerts a force on the closing member 24 in the opening direction of the seat valve 31. At the flattening 25, the pressure fluid is diverted approximately perpendicular to the axis of the longitudinal bore 29, tappet 22, and armature 21, so that it flows toward the lateral bore 34. The pressure fluid streams do not hit the guide body 38, but enter the valve chamber 35 by means of the axial gap 40. Upon a pressure discharge from the master cylinder, the pressure fluid flows in the reverse direction toward the master cylinder by means of the axial gap 40 and the open seat valve 31 as well as by means of the check valve 54 disposed parallel to the valve 10.

In a braking where there is the danger of locking, the valve 10 is switched to the work position by means of exciting the magnet coil 17, in which position the seat valve 31 is transferred to its closed position by means of movement of the magnetic armature 21 against the tension of the restoring spring 32. At the same time, the outlet valve in the return line (see FIG. 1 in German Patent 39 34 771 C1) is switched into the open position and the return feed pump is set into operation. Pressure on the brake cylinder side is decreased and the danger of locking is reduced by means of withdrawing partial quantities of pressure fluid from the brake cylinder and returning them to the master cylinder. In the phase following a pressure decrease, to retain pressure in the brake cylinder, the valve 10 remains in the work position, while the outlet valve in the return line is switched to the closed position.

Figure 2:
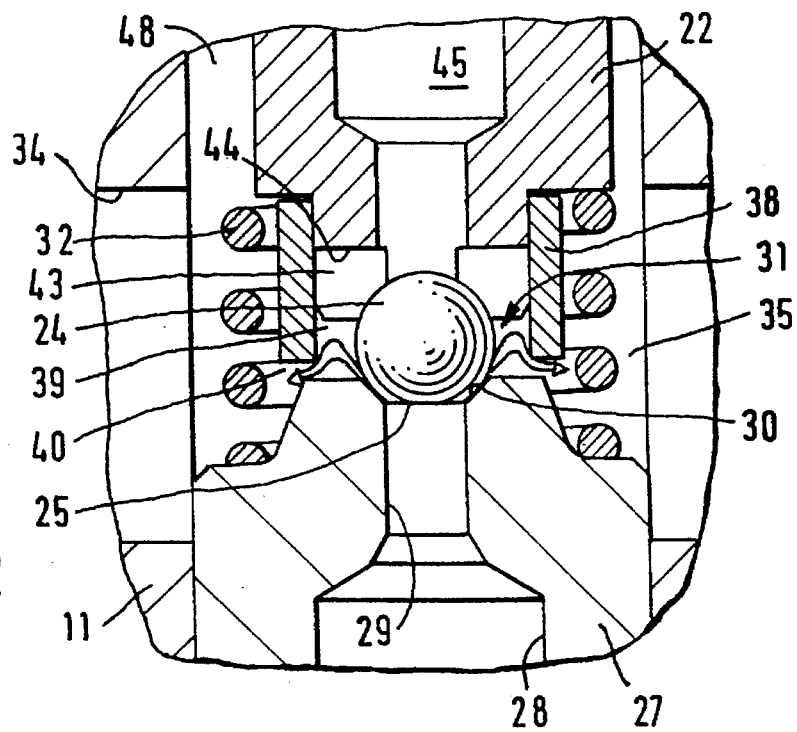
FIG. 2 shows an enlarged detail of a partially open seat valve, which detail is denoted in FIG. 1 by the letter X.

To build up pressure in the brake cylinder, the outlet valve remains in the closed position while the valve 10 is no longer excited. This leads to a movement of the magnetic armature 21 as a result of the effect of hydraulic forces and of the restoring spring 32 toward the control chamber 46 so that the closing member 24 begins to clear the valve seat 30 and the seat valve 31 is opened (FIG. 2). As a result of the pressure decrease in the brake cylinder, a pressure difference prevails between the inlet side and the outlet side of the seat valve 31. The lower pressure on the outlet side also effects the face end 49 of the magnetic armature 21 close to the closing member 24 by means of the second pressure fluid conduit 48. During the opening motion of the magnetic armature 21, a banking-up pressure in the partial valve chamber 43, produced by pressure fluid flowing from the master cylinder side, additionally impinges on the control chamber 46 by means of the first pressure fluid conduit 45. The banking-up pressure is produced in this way: in extension of the opening gap between the valve seat 30 and the spherical segment of the closing member 24 associated with this seat in the region of the radial gap 39 between the guide body 38 and the closing member 24, pressure fluid streams, indicated by means of arrows in FIG. 2, enter the partial valve chamber 43 and can leave it only upon changing their flow direction and upon penetration of the throttling axial gap 40 into the valve chamber 35.

The circumference side sealing of the magnetic armature 21 prevents a pressure balancing between both face ends 47 and 49 of the magnetic armature 21. The magnetic armature 21 that is not pressure balanced is thus subject to a force directed against the restoring spring 32, which force allows the magnetic armature 21, having its valve tappet 22 and closing member 24, to assume a position between the closed position and the open position of the seat valve 31. The reduction of the through flow cross section of the partially open seat valve 31 caused by this leads to a throttling of the pressure fluid stream having retarded pressure buildup in the brake cylinder. With an adequate pressure difference, the valve 10 regulates the volume flow to a largely constant measure, because a higher pressure differential leads to a greater backing-up pressure, having reduction of the through flow cross section at the seat valve 31 that results from that, and vice versa.

With the abatement of the pressure difference, the backing-up pressure in the partial valve chamber 43 also reduces. The restoring spring 32 guides the magnetic armature 21 back to its rest position. The valve 10 clears its entire through flow cross section in the seat valve 31 for the next normal braking. However at a reduced through flow cross section of the seat valve 31, if the braking is stopped by means of the master cylinder discharging, the pressure fluid can also flow away unchecked out of the brake cylinder by means of the check valve 54.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the U.S. is:

1. An electromagnetically actuated valve (10), for slip-controlled hydraulic brake systems in motor vehicles, in which:

a circular, cylindrical magnetic armature (21) is received so that it moves longitudinally in a closed, tubular valve dome (14), the valve dome (14) is encompassed by a magnet coil (17), a valve tappet (22), having a closing member (24) disposed remote from the armature, leads from the magnetic armature (21), a valve body (27), having a valve seat (30) and having a longitudinal bore (29) that feeds into this seat, is attached in a housing (11) of the valve (10) as a pressure fluid inlet, when the magnet coil (17) is not excited, the closing member (24) is lifted from the valve seat (30) due to the effect of a restoring spring (32), the closing member (24) and the part of the valve body (27) which has the valve seat (30) are situated forming a seat valve (31) in a valve chamber (35), which communicates with a pressure fluid outlet of the valve (10), the valve chamber (35) has a partial valve chamber (43), which functions as a retaining capacity, and from which a first pressure fluid conduit (45) leads to a control chamber (46), which is disposed between a valve dome (14) and a face end (47) of the magnetic armature (21) remote from the closing member (24), a second pressure fluid conduit (48) leads from the valve chamber (35) to a face end (49) of the magnetic armature (21) close to the closing member (24), a pressure produced in the partial valve chamber (43) creates in the control chamber (46) a force that acts on the magnetic armature (21) against the tension of the restoring spring (32), as a result of which, the seat valve (31) assumes a partially closed position, which differs from its rest position, the valve seat (30) is embodied having an open contour cross sectional in comparison to the partial valve chamber (43), the valve closing member (24), in cross section, is at least approximately adapted to the contour of the valve seat (30) and has a flattening end (25) directed against the longitudinal bore (29) of the valve body (27).

2. The valve according to claim 1, in which the valve seat (30) is embodied as a hollow, straight, circular, truncated cone, while the closing member (24) on the valve seat side has the form of a spherical section, whose circular end surface (25) is oriented toward the longitudinal bore (29) of the valve body (27) extending at right angles to the bore's axis and has a diameter that corresponds at least approximately to the diameter of the bore.

3. The valve according to claim 2, in which the partial valve chamber (43) is encompassed on its circumference side by a sleeve-shaped guide body (38) coaxially disposed on the valve tappet (22), which guide body (38), in a partially closed position of the seat valve (31), encompasses the closing member (24) having a surrounding space and adjoins the valve body (27) having a narrow gap (40).

4. The valve according to claim 1, in which the partial valve chamber (43) is encompassed on its circumference side by a sleeve-shaped guide body (38) coaxially disposed on the valve tappet (22), which guide body (38), in a partially closed position of the seat valve (31), encompasses the closing member (24) having a surrounding space and adjoins the valve body (27) having a narrow gap (40).

5. The valve according to claim 1, in which the magnetic armature (21) is sealed on its circumference side against the valve dome (14).

* * * * *